(12) United States Patent
Port-Robach et al.

(10) Patent No.: US 8,052,084 B2
(45) Date of Patent: Nov. 8, 2011

(54) MECHANICAL CONNECTION BETWEEN A PRIMARY NUT AND SECONDARY NUT

(75) Inventors: Isabelle Port-Robach, Deuil la Barre (FR); Raphaël Medina, Ecouen (FR); Christian Dorval, Colombes (FR); Rui Amaral, Morangles (FR)

(73) Assignee: Goodrich Actuation Systems SAS, Buc (FR)

( * ) Notice: Subject to any disclaimer, the term of this patent is extended or adjusted under 35 U.S.C. 154(b) by 779 days.

(21) Appl. No.: 12/117,977

(22) Filed: May 9, 2008

(65) Prior Publication Data
US 2009/0041561 A1  Feb. 12, 2009

(30) Foreign Application Priority Data
May 11, 2007 (FR) ...................................... 07 55040

(51) Int. Cl.
*B64C 9/00* (2006.01)
(52) U.S. Cl. ....................... 244/99.3; 244/99.2; 244/99.4
(58) Field of Classification Search .................. 244/99.2, 244/99.3, 99.4
See application file for complete search history.

(56) References Cited

U.S. PATENT DOCUMENTS

| 6,672,540 B1 * | 1/2004 | Shaheen et al. | 244/99.3 |
| 6,685,382 B2 * | 2/2004 | Capewell et al. | 403/343 |
| 6,851,648 B2 * | 2/2005 | Perni et al. | 244/99.3 |
| 7,866,602 B2 * | 1/2011 | Port-Robach et al. | 244/99.4 |
| 2003/0029258 A1 * | 2/2003 | Davies et al. | 74/89.26 |
| 2004/0200929 A1 * | 10/2004 | Perni et al. | 244/75 R |
| 2005/0132831 A1 * | 6/2005 | Scholz | 74/89.26 |

FOREIGN PATENT DOCUMENTS

| DE | 12 94 132 | 4/1969 |
| DE | 103 48 320 | 5/2005 |
| EP | 1 398 542 | 3/2004 |
| FR | 2 885 396 | 11/2006 |
| FR | 2885396 | * 11/2006 |

* cited by examiner

*Primary Examiner* — Tien Dinh
*Assistant Examiner* — Justin Benedik
(74) *Attorney, Agent, or Firm* — Harness, Dickey & Pierce, P.L.C.

(57) ABSTRACT

The assembly comprises a first and a second nut intended to cooperate with a screw in particular provided in an adjustable tailplane actuator for an aircraft, and a mechanical connection between the first and the second nut comprising means for fusible driving of the second nut by the first nut, in which the mechanical connection also comprises adjustable spacing means forming a wedge between the first and second nuts.

18 Claims, 3 Drawing Sheets

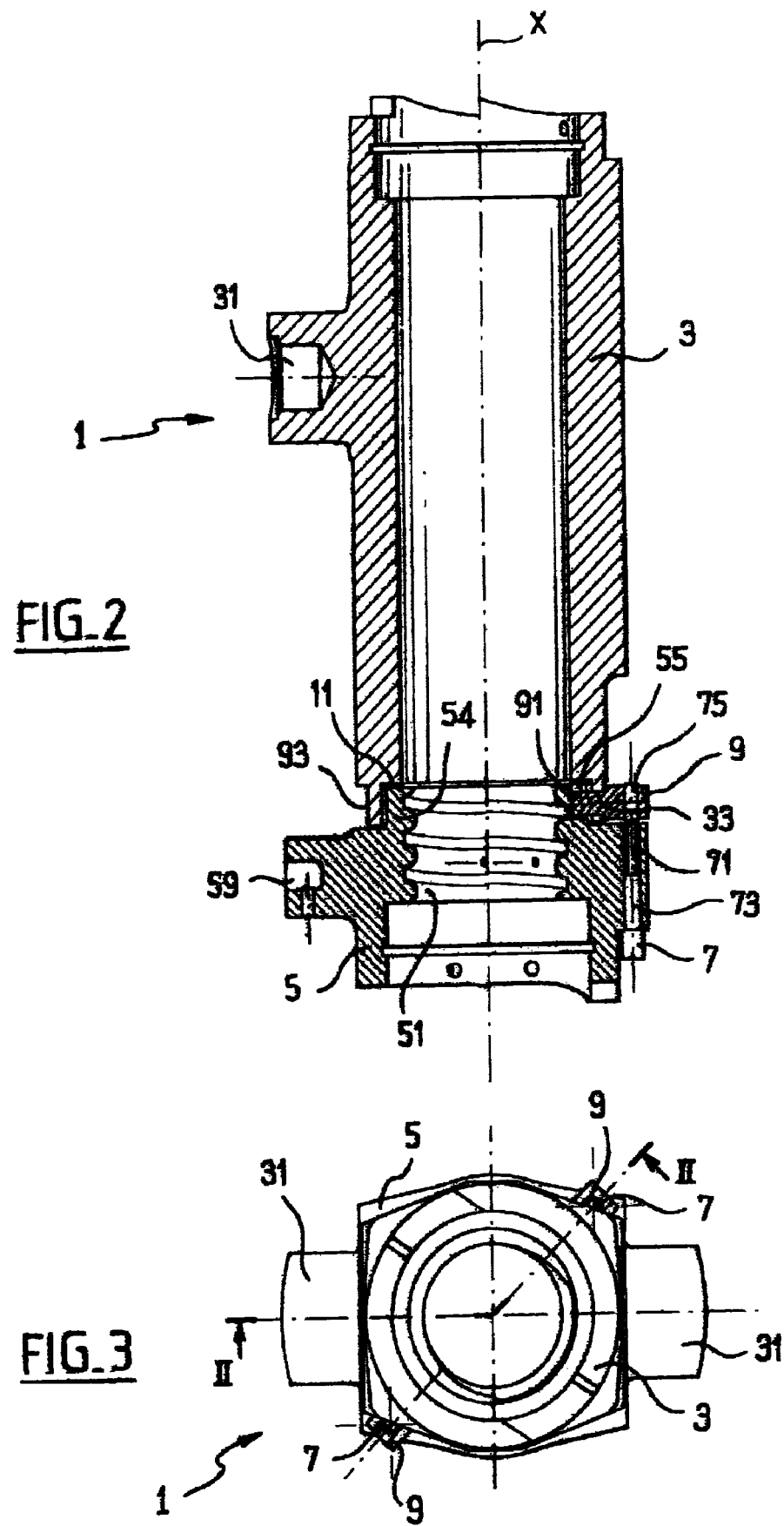

MECHANICAL CONNECTION BETWEEN A PRIMARY NUT AND SECONDARY NUT

CROSS REFERENCE TO RELATED APPLICATIONS

This application claims priority to French Application No. 0755040, filed May 11, 2007, which is incorporated by reference herein.

BACKGROUND AND SUMMARY

The invention relates to a mechanical connection between a primary nut and a so-called "failsafe" secondary nut, as well as the assembly thus formed.

The invention is intended in particular for use in the case of a THSA actuator (Trimmable Horizontal Stabilizer Actuator) provided on aircrafts. These actuators comprise two mechanical means, one primary, the other secondary, with the latter being intended to take up the stress when a failure occurs in the primary means. Each of the primary and secondary means is associated with a primary and secondary nut, respectively. In normal operation on the primary means, the forces pass through the primary nut to a ball or roller screw, from a variable tailplane of an aircraft, and vice versa. The secondary nut is mechanically connected to the primary nut in order to follow the latter in its translation movements along the ball or roller screw, without being subjected to any stresses. For this, the secondary nut has a treading complementary to the threading of the ball or roller screw, but having a play therewith, and is connected to the primary nut by means of a radially mounted fusible pin perpendicular to the axis of the screw. The pin, while ensuring that the primary nut is followed by the secondary nut, makes it possible to preserve the play between the threadings of the secondary nut of the screw so that there is no contact between them in normal operation.

In the event of a failure of the primary means, in particular at the level of the primary nut, the forces first pass from the variable tailplane of the aircraft through the primary nut to the secondary nut via the pin. The play between the threadings of the secondary nut and the screw is recovered, causing the transmission of the previous forces from the secondary nut to the screw. However, when the forces that pass are greater than the value of a predetermined load, the pin then acts as a fuse and breaks, thus releasing the secondary nut from the primary nut. Then, the forces pass from the variable tailplane to the screw via the secondary nut, implementing the secondary means of the actuator.

The following disadvantage arises from the fusible pin technology. When assembling the two nuts on the screw, it is necessary to use a complex instrumentation in order to hold the two nuts in a relative position with respect to one another so that the precise play between the threading of the secondary nut and the threading of the screw is present. Thus, the housing of the pin is back-drilled via the two nuts and the pin is put in place. This operation is time-consuming and costly.

An objective of the invention is to propose an assembly formed by the primary nut and the secondary nut, with a simplified and faster assembly, while ensuring optimal reliability in the event of an operation failure of the primary nut. To this end, the invention proposes an assembly comprising a first and a second nut, intended to cooperate with a screw, in particular provided in an adjustable tailplane actuator for an aircraft, and a mechanical connection between the first and the second nut comprising means for fusible driving of the second nut by the first nut, in which the mechanical connection also comprises adjustable spacing means forming a wedge between the first and second nuts. Thus, the use in the mechanical connection of adjustable spacing means forming a wedge between the first and second nuts enables the quick, simple and secure positioning while maintaining the precise play desired, without requiring equipment that is heavy and expensive, both in terms of cost and time, in order to produce the mechanical connection between the two nuts.

Advantageously, but optionally, the assembly comprises at least one of the following features:
- the adjustable spacing means are constituted by a wedge capable of being adjusted in thickness;
- the adjustable spacing means are constituted by a pealable or separable wedge;
- the fusible driving means comprise a fusible link anchored in the first nut and extending into the second nut;
- the link is substantially parallel to an axis of the second nut;
- the link is screwed into the first nut;
- the link comprises a portion with cross-section sized so as to break under a predetermined load;
- the link comprises a portion with a cross-section sized so as to break with a predetermined extension.

According to the invention, an adjustable tailplane actuator for an aircraft comprising an assembly with at least one of the aforementioned features is also proposed.

BRIEF DESCRIPTION OF THE DRAWINGS

Other features and advantages of the invention will become clear from the following description, provided for purely illustrative and non-limiting purposes, to be read in view of the appended drawings, in which:

FIG. 2 is a longitudinal cross-section view according to II-II of the assembly according to the first embodiment;

FIG. 3 is a top view of the first embodiment of the assembly according to the invention.

DETAILED DESCRIPTION

Figure 1:
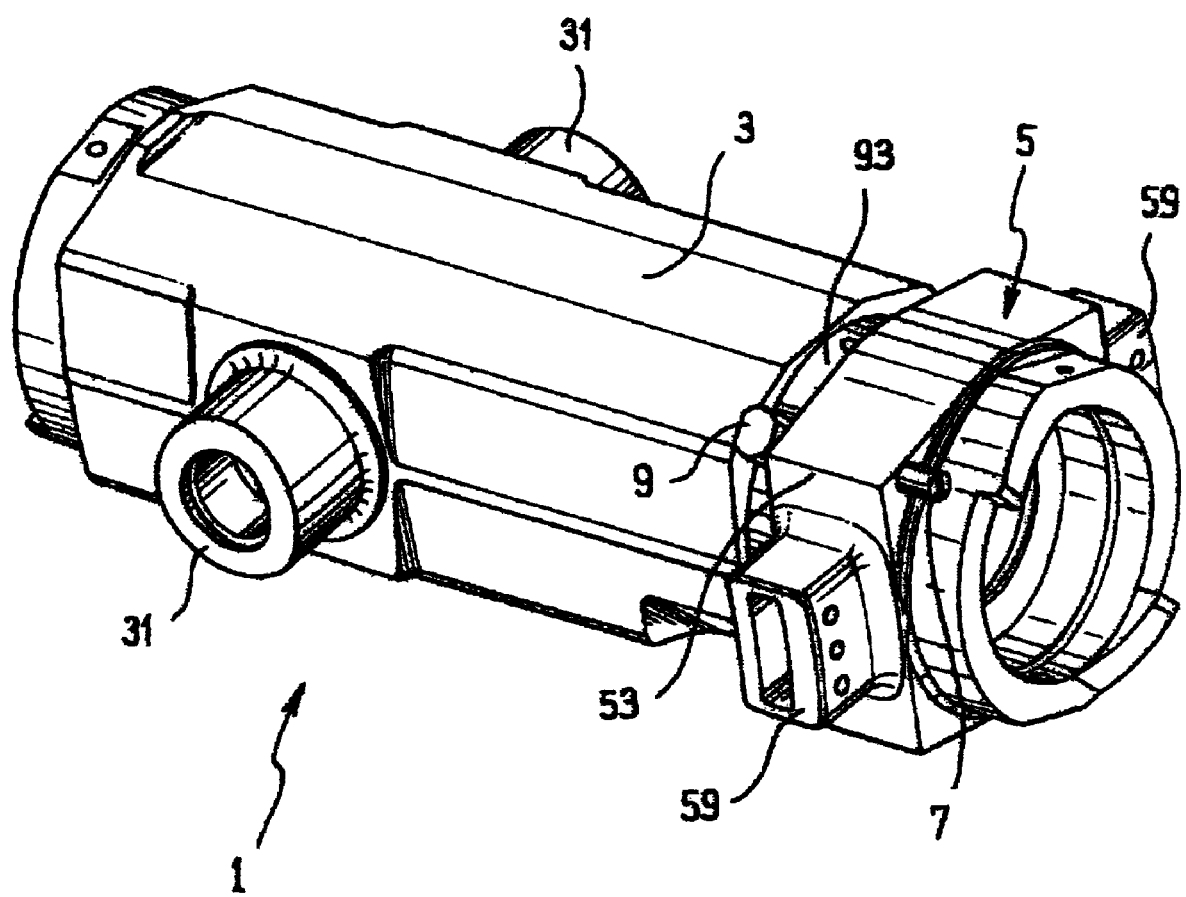
FIG. 1 is a three-dimensional drawing of an assembly according to the invention, of a primary nut and a secondary nut according to the first embodiment.

In reference to FIGS. 1 to 3, we will now describe a first embodiment of the invention. An assembly according to the invention comprises two nuts 3 and 5. Nut 3 is called the primary nut, while nut 5 is called the secondary nut. The assembly 1 has a longitudinal axis X. It is capable of being mounted on a screw not shown and extending according to the X-axis.

The primary nut 3 has, on an external surface, means 31 for connection with an adjustable tailplane according to primary means, neither of which are shown, in the context of a THSA actuator for an aircraft. At one of its ends, the primary nut 3 has a collar 93. This collar 93 comprises orifices 33 capable of receiving a pin 9, which will be described below. The primary nut 3 can be a ball or roller nut intended to be mounted on a so-called ball or roller screw, respectively.

The secondary nut 5 has, on an external surface, means for connection 59 with the adjustable tailplane via so-called secondary means, neither of which are shown, in the context of a THSA actuator for an aircraft. In an internal bore passing through along the X-axis, the secondary nut 5 has a threading 51. This threading is complementary in its shape to the threading of the screw on which it is intended to be mounted, assembled to the primary nut 3. This threading 51, although complementary to the threading of the screw on which it is intended to be mounted, is of a size so that once it has been mounted, the threading 51 of the nut has a play with the threading of the screw on which it is mounted. At one of its ends, the secondary nut 5 has a collar 54 capable of being received by the collar 93 of the primary nut 3, as shown in FIG. 2. The collar 54 has openings 55 capable of receiving, when the secondary nut 5 is mounted on the primary nut 3, the aforementioned pin 9. Angularly, in line with said openings 55, the secondary nut 5 comprises protuberances 53 extending radially outwardly, projecting from the external surface and in which a through-hole is provided, substantially parallel to the X-axis of the secondary nut 5. The through-hole is capable of receiving a link 7, which will be described below. It should be noted that the orifices 33 of the collar 93 of the primary nut 3, the openings 55 of the collar 54 of the secondary nut 5, as well as the protuberances 53, are in this case, as shown, in pairs located diametrally opposed with respect to the X-axis of the assembly 1.

The assembly 1 also comprises a wedge 11 inserted between the primary nut 3 and the secondary nut 5. The role of this wedge 11 is to ensure the precise relative positioning between the primary nut 3 and the secondary nut 5. The thickness of the wedge 11 is calculated so that, once the two nuts have been mounted on the screw not shown, a play appears between the threading 51 of the secondary nut 5 and the threading of the screw on which the assembly 1 is mounted. This play makes it possible, in normal, effective operation of the assembly 1 mounted on the screw, for there to be no contact between the threading 51 of the secondary nut 5 and the threading of the screw. The wedge 11 can be obtained directly by calculation or adjusted, for example, by machining, by pealable means or by grading, or any other means enabling the required play to be obtained.

The wedge 11 is, as shown in FIG. 2, located between an end surface of the collar 54 and a base of the bore delimited by the collar 93 of the primary nut 3. Alternatively, the nut 11 is located between an end surface of the collar 93 and an edge substantially perpendicular to the X-axis of the secondary nut 5 located at the foot of the collar 54.

In addition, the assembly 1 according to the invention comprises a pin 9 associated with a link 7. The pin 9 includes a tail 91 as well as a threaded opening perpendicular to the tail 91 of the pin 9. The pin 9 is mounted radially with respect to the X-axis in the orifice 33 of the collar 93 of the primary nut 3, through which it passes, and into the opening 55 formed in the collar 54 of the secondary nut 5, which is then mounted on the primary nut 3, so that the openings 55 and the orifices 33 are opposite one another. With the pin 9 thus mounted, the threaded orifice perpendicular to the tail 91 of the pin 9 is located opposite the through-hole of the protuberance 53. Then, a link 7 is inserted into said orifice, as shown in FIG. 2. The link 7 has a general rotating form and successively comprises a head 7 of which the diameter is greater than a diameter of the through-hole of the protuberance 53 in which it is received, then a smooth cylindrical rotating portion 73 of which the diameter is slightly smaller than the diameter of the through-hole in which the link 7 is received, then a portion 71 having a reduced diameter, and finally, a threaded portion 75 capable of being screwed into the threaded orifice of the pin 9. The portion 71 of the link 7 has a cross-section sized so that, when a predetermined pulling force is exerted between the threaded portion 75 and the head 7, the portion 71 breaks. This breakage occurs after a predetermined extension according to the cross-section of the portion 71 subjected to said predetermined pulling force.

The mounting of the assembly 1 includes the primary nut 3, the wedge 11 and the secondary nut 5, which are stacked one on top of another. The orifices 33 are placed opposite openings 55 in order to enable pins 9 to be mounted. Finally, the links 7 are inserted into the through-hole of the protuberances 53 and are screwed into the threaded orifice of the pins 9 so as to hold the stack of the primary nut 3, the wedge 11 and the secondary nut 5 during normal operation. However, the pulling force caused by the tightening of the links 7 in order to hold the stack should be negligible with respect to the predetermined pulling force for breaking the portion 71 of the links 7.

Figure 4:
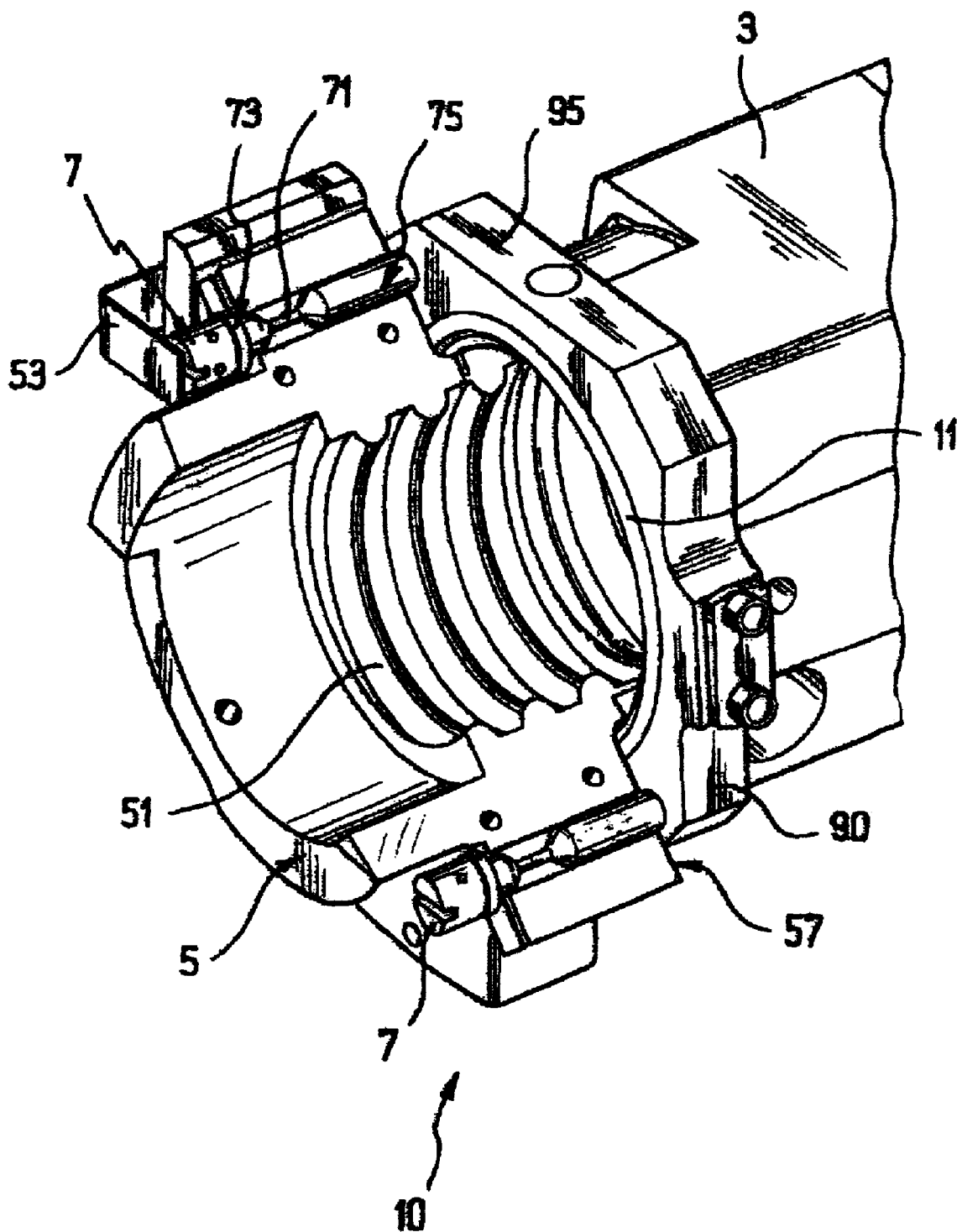
FIG. 4 is a partial three-dimensional view of an assembly according to a second embodiment of the invention.

We will now, in reference to FIG. 4, describe a second embodiment of an assembly according to the invention. We will simply describe the differences between this second embodiment and the first embodiment of the invention described above. The main difference lies in the collar 90 of the primary nut 3, which is differentiated from the collar 93 of the primary nut 3 of the preceding embodiment. The collar 90 has protuberances 95 projecting outwardly and radially with respect to the X-axis. These protuberances 95 make it possible to eliminate, in this embodiment, the pins 9 of the first embodiment described above. These protuberances 95 therefore have a threaded orifice capable of receiving, by screwing, the threaded portion 75 of the link 7. The wedge 11 is mounted between the secondary nut 5 and the primary nut 3 according to the alternative mounting described in the first embodiment: between an end surface of the collar 95 and an edge of the nut 5 extending radially outwardly and perpendicularly to the X-axis at the foot of the collar 54.

In addition, the assembly 10 comprises retaining means 53. These retaining means 53 make it possible to hold the head 7 and the portion 73 of the link 7 in place when the portion 71 of the link 7 is broken under the effect of a predetermined pulling force. This prevents, in the event of a breakage, said portion of the link 7 from damaging, by breaking away, other components of the aircraft on which the assembly 10 is installed.

In the two embodiments, when there is a failure of the primary nut 3 leading to a loss in connection between the primary nut 3 and the screw, there is a change in the flow of forces originating in the adjustable tailplane. First, according to the loss in connection between the primary nut/screw, the forces originating from the adjustable tailplane always pass through the primary means to the primary nut 3, then via the links 7 to the secondary nut 5. The play between the threadings of the secondary nut and the screw is then taken up, and the threadings come into mutual contact. And the forces are transmitted to the screw by the secondary nut 5. Second, once the forces originating from the adjustable tailplane reach a value greater than the pulling effect causing a breakage of the portion 71 of the links 7, the latter break, detaching the secondary nut 5 from the primary nut 3. Then, the forces originating from the adjustable tailplane pass directly via the secondary means to the secondary nut 5, and from there to the screw.

The invention claimed is:

1. An assembly comprising at least one first and one second nut that cooperates with a screw provided in an adjustable tailplane actuator for an aircraft, and a mechanical connection between the first and the second nut comprising a fusible link anchored in one of the first nut and the second nut and extending into the other of the first nut and the second nut, the fusible link shaped so as to break upon subjection to a predetermined pulling force, in which the mechanical connection also comprises adjustable spacing means forming a wedge between the first and second nuts.

2. The assembly according to claim 1, wherein the adjustable spacing means includes a wedge capable of being adjusted in thickness.

3. The assembly according to claim 1, wherein the adjustable spacing means includes a pealable or separable wedge.

4. The assembly according to claim 1, wherein the adjustable spacing means includes a graded wedge.

5. The assembly according to claim 1, wherein the link is substantially parallel to an axis of the second nut.

6. The assembly according to claim 1, wherein the link is screwed into the first nut.

7. The assembly according to claim 1, wherein the link comprises a portion with a cross-section sized so as to break with a predetermined extension.

8. The assembly of claim 1, further comprising an adjustable tailplane actuator for an aircraft.

9. An assembly configured to cooperate with a screw provided in an adjustable tailplane actuator for an aircraft, the assembly comprising:
 a first nut cooperating with the screw provided in the adjustable tailplane actuator having a collar extending therefrom, the collar defining an orifice that extends radially relative to an axis of the screw;
 a second nut cooperating with the screw provided in the adjustable tailplane actuator, the second nut having a protuberance that defines a through-hole;
 a pin having a first portion that extends into the orifice of the first nut in an installed position, the pin having a second portion that defines an opening that is substantially perpendicular to the orifice of the first nut in the installed position and that selectively aligns with the through-hole of the second nut; and
 a fusible link that at least partially extends into the through-hole and the opening of the pin.

10. The assembly of claim 9 wherein the pin includes a tail having a longitudinal body that is configured to extend into the orifice of the first nut and wherein the opening of the pin is perpendicular to the tail.

11. The assembly of claim 10 wherein the link has a general rotating form and successively comprises a head, a cylindrical rotating portion, a reduced diameter portion and a threaded portion.

12. The assembly of claim 11 wherein the opening of the pin is threaded and wherein the threaded portion of the link is configured to threadably mate with the threaded opening of the pin.

13. The assembly of claim 11 wherein the reduced diameter portion is configured to break subsequent to a predetermined pulling force between the head and the threaded portion.

14. The assembly of claim 9, further comprising a wedge configured to be inserted between the first nut and the second nut.

15. An assembly configured to cooperate with a screw provided in an adjustable tailplane actuator for an aircraft, the assembly comprising:
 a first nut cooperating with the screw provided in the adjustable tailplane actuator;
 a second nut cooperating with the screw provided in the adjustable tailplane actuator;
 a fusible link that connects the first and second nuts, the fusible link extending substantially parallel to an axis of a central opening in the second nut, the fusible link shaped so as to break upon subjection to a predetermined force causing the second nut to be released from connection with the first nut; and
 a wedge positioned between the first nut and the second nut that maintains relative positioning between the first nut and the second nut.

16. The assembly of claim 15 wherein the second nut has threads around an inner diameter and wherein the wedge has a thickness that causes the threads of the second nut to have play relative to opposing threads formed on the screw and whereupon breaking of the fusible link, the play is taken up and the threads of the second nut to come into mutual contact with the threads of the screws.

17. The assembly of claim 15 wherein the first nut has a collar that defines an orifice that extends radially relative to an axis of the screw and wherein the second nut defines a through-hole, the assembly further comprising:
 a pin that is configured to extend into the orifice of the first nut, the pin defining an opening that selectively aligns with the through-hole of the second nut; and
 wherein the fusible link extends into the through-hole of the second nut and the opening of the pin.

18. The assembly of claim 15, further comprising an adjustable tailplane actuator for an aircraft.

\* \* \* \* \*